US012600064B2

(12) United States Patent
Abram

(10) Patent No.: US 12,600,064 B2
(45) Date of Patent: Apr. 14, 2026

(54) FOAM ARTICLE

(71) Applicant: Daniel Eamon Abram, Vancouver (CA)

(72) Inventor: Daniel Eamon Abram, Vancouver (CA)

( * ) Notice: Subject to any disclaimer, the term of this patent is extended or adjusted under 35 U.S.C. 154(b) by 89 days.

(21) Appl. No.: 18/264,657

(22) PCT Filed: Feb. 15, 2022

(86) PCT No.: PCT/IB2022/051345
§ 371 (c)(1),
(2) Date: Aug. 8, 2023

(87) PCT Pub. No.: WO2022/172257
PCT Pub. Date: Aug. 18, 2022

(65) Prior Publication Data
US 2024/0308118 A1 Sep. 19, 2024

Related U.S. Application Data

(60) Provisional application No. 63/149,634, filed on Feb. 15, 2021.

(51) Int. Cl.
*B29C 44/44* (2006.01)
*B29C 44/34* (2006.01)

(52) U.S. Cl.
CPC ........ *B29C 44/445* (2013.01); *B29C 44/3426* (2013.01)

(58) Field of Classification Search
None
See application file for complete search history.

(56) References Cited

U.S. PATENT DOCUMENTS

2013/0115399 A1* 5/2013 Roberts .................. B63B 22/00
428/36.5
2021/0197427 A1* 7/2021 Su ....................... B29C 44/3461

* cited by examiner

*Primary Examiner* — Jacob T Minskey
*Assistant Examiner* — Adrien J Bernard

(57) ABSTRACT

The invention is inspired by the animal bone structure which is normally hollow in the middle. The invention introduces a novel foam article and a method of manufacturing it to include cavities similar to the bone structure. The novel foam article comprises a cavity-defining structure that is placed inside a mould prior to introducing expanded polymer beads into the mould. The cavity-defining structure comprises hollow compartments or layers that create macro-cavities and hollow compartments in specific sizes and locations of the foam article during the moulding process. As a result, the foam article equipped with the cavity-defining structure uses fewer polymer beads and is lighter than foam articles made conventionally. The invention also improves the foam article in terms of its shock absorption, durability, thermal insulation, acoustic insulation, and floatation.

19 Claims, 3 Drawing Sheets

[Fig. 1]
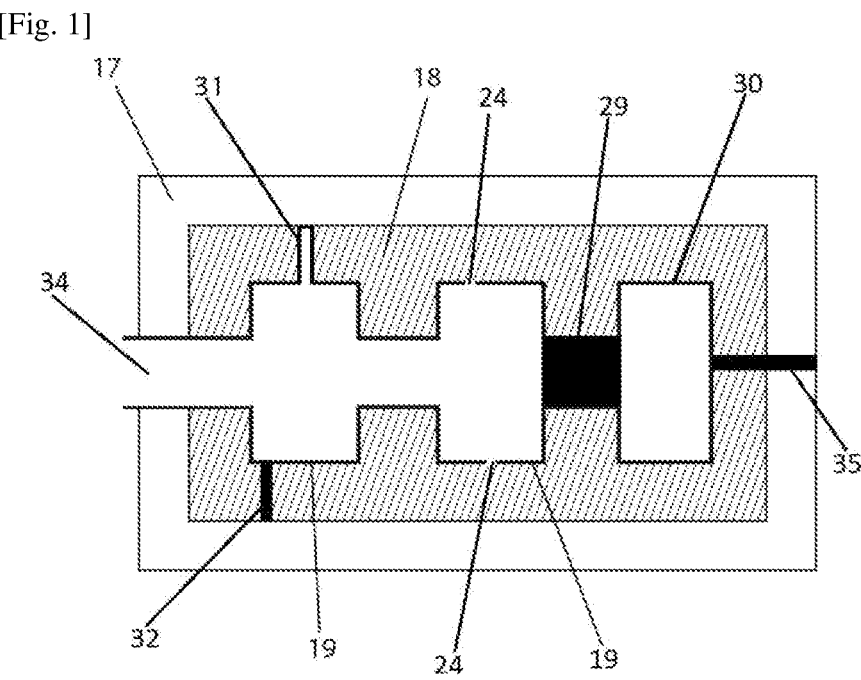
[Fig. 2]
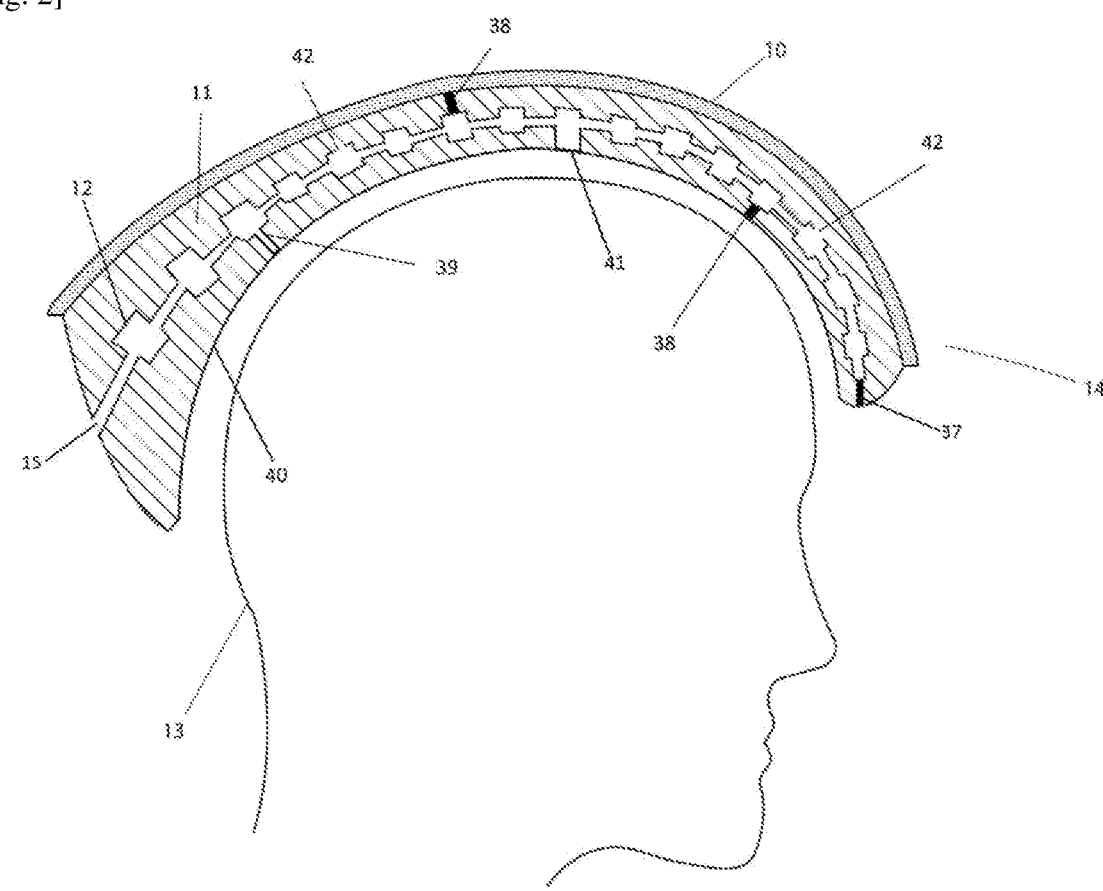

[Fig. 3]
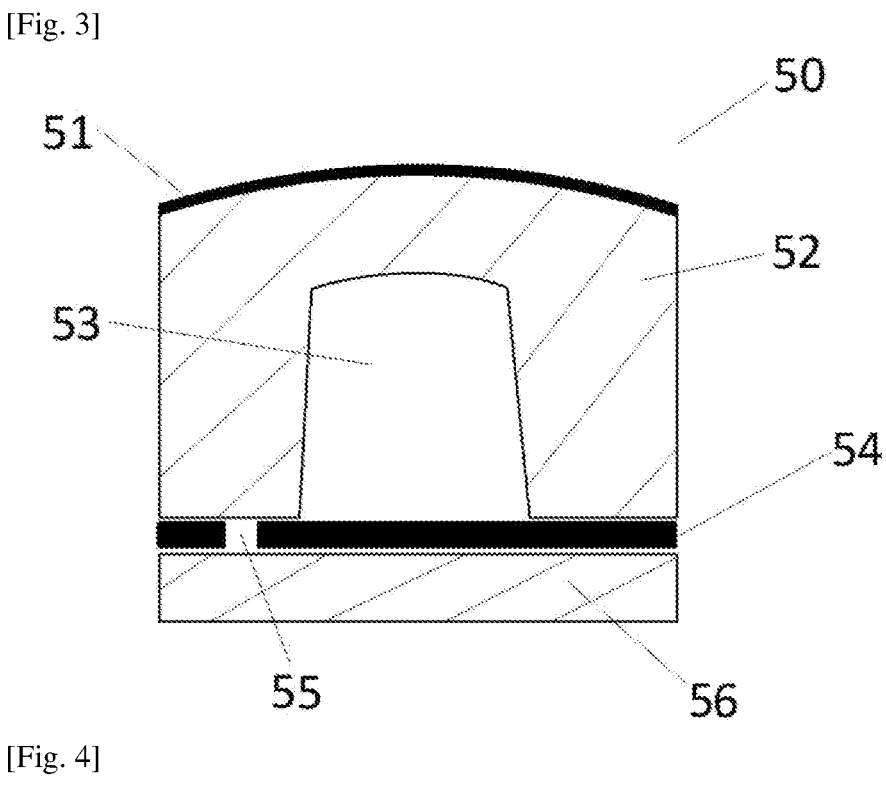
[Fig. 4]
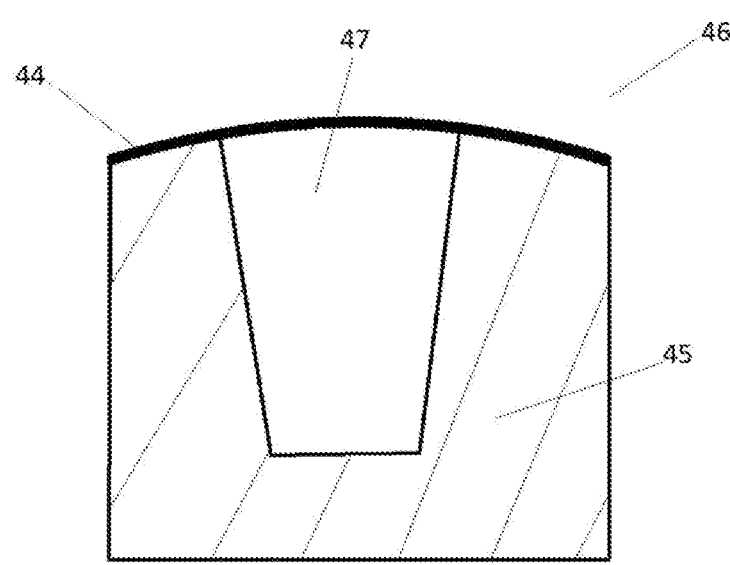

[Fig. 5]
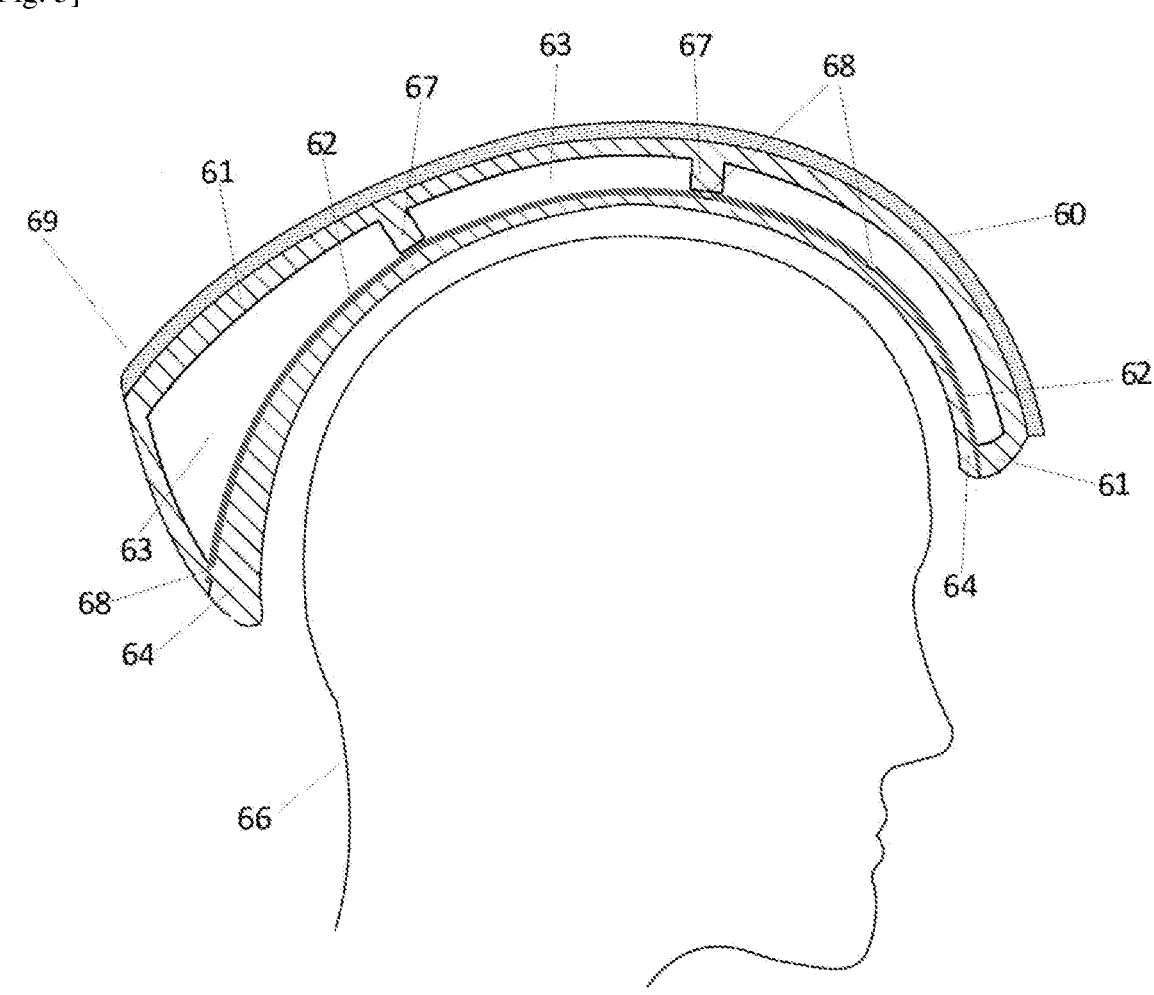

FOAM ARTICLE

BACKGROUND ART

Foam is widely used in many applications such as impact protection, comfort, thermal insulation, acoustic insulation, floatation, and construction. The foam article manufacturing has been mostly focused on making foams that have a single density and, in many cases, foams are not sufficiently optimized for specific applications. This results in making foams that are relatively heavy and are not optimized in terms of strength, density, durability, insulation, and shock-absorbing capability for a given application.

Customizing a foam article by just uniformly varying the density and porosity in a micro-level does not necessarily provide the best result for a given application. For instance, Expanded Polystyrene (EPS) beads after curing and ageing are about 95% air and only 5% plastic. However, an EPS foam made from the beads may not be in its full capacity of strength, shock-absorbing ability, floatation, durability and insulation for the volume it occupies. With vast applications for foam articles, enhancing the foam characteristic and reducing its weight is desirable in many applications.

In almost all applications of foam articles, maximum performance and minimum weight are desirable and using single-density foams in their available forms may not yield the best results. In applications such as thermal and acoustic insulation (in machines, appliances, and construction), shock-absorption (in head protection, body protection, and vehicles), and transportation (in vehicles, and vessels) a single-density foam is mainly used. In some designs, layers of foams with different densities are used to improve the shock-absorption capability of a foam article. Multi-density foams can perform better than single-density foams, but they can be costly and have limitations in design. Floating applications such as boats, buoys, and surfboards also mainly usec foam articles with single density.

A foam's mechanical properties can vary depending on the production procedure and the type of polymer used. In general, foams can be divided into two categories, single-impact, and multiple-impact foams. The single impact foams such as EPS and EPA (Expanded Polylactic Acid) after deformation by an impact they do not go back to their original form and their structures will be permanently compromised. On the other hand, multiple-impact foams such as those made from polypropylene or polyethylene can return to their initial form after being deformed. Due to the high volume of foam used in various applications, any improvement to enhance the foam characteristic and reduce the amount of foam used for a given application is attractive to the industry.

SUMMARY OF INVENTION

This summary is provided to introduce a variety of concepts in a simplified form that are further described below in the Detailed Description. This summary is not intended to explain important features of the claimed subject matter, nor is it intended to be used as a tool in determining the scope of the claimed subject matter. In an aspect, the present disclosure describes a novel foam article, and the method of making such foam articles.

Foams are mainly comprising very small cavities (micro-porosities or micro-cavities) that in most cases are uniformly distributed throughout their structure.

The presented invention resulted from observing and mimicking nature. Particularly, the invented design is inspired by the bone structure. Bones may look solid to the naked eye, yet they comprise micro-cavities as well as macro-cavities. The macro-cavities in the bone structure are usually in the form of hollow space in the middle of the bone. This allows the bone to have an optimum structure by harvesting the benefits of both micro and macro cavities. By mimicking bone structure, this invention describes a foam article structure with both micro-cavities and macro-cavities. The invention also describes methods of moulding foam articles to enhance the foam article performance for a given application by creating and engineering larger cavities (macro-cavities) in any given foam articles. The invention also allows a more sustainable usage of foam by reducing the amount of expanded polymer beads used for the foam article.

According to a first aspect of the invention, there is provided a method of manufacturing a foam article by providing a cavity-defining structure into a mould when moulding expanded polymer beads to create macro-cavities in the foam article.

The cavity-defining structure may comprise objects with open cavities, objects with closed cavities, sheets, covering layers, meshed layers, object with perforations, hollow bodies, solid bodies, or a combination thereof.

The moulding process may be done in two or more phases using covering layers as the cavity-defining structure in the foam article.

The moulding process may be done in one phase when objects with open cavities, object with closed cavities, or hollow bodies are used as the cavity-defining structure in the foam article.

Moulding with the expanded polymer beads and the cavity-defining structure may be done in multiple moulding processes, wherein a foam article with an open-cavity is made in the first moulding process, and in the second moulding process, the foam article with an open cavity is covered partially or entirely by the cavity-defining structure, and then the expanded polymer beads are introduced to the mould to create the intended cavity in the foam article.

Moulding with the expanded polymer beads and the cavity-defining structure may be done in a single moulding process, wherein the cavity-defining structure is placed inside a mould prior to introducing the expanded polymer beads into the mould to create the intended cavity in the foam article based on the shape, location, and configuration of the cavity-defining structure.

According to a second aspect of the invention, there is provided a foam article comprising expanded polymer beads and a cavity defined by a cavity-defining structure within the expanded polymer beads, wherein the cavity-defining structure comprises objects with one of: open-cavities, objects with closed cavities, sheets, covering layers, meshed layers, objects with perforations, hollow bodies, solid bodies, or a combination thereof.

Further aspects of preferred embodiments are provided in the dependent claims.

BRIEF DESCRIPTION OF DRAWINGS

The foregoing aspects of the present disclosure will become more readily appreciated as the same will become better understood by reference to the following detailed description, when taken in conjunction with the accompanying drawings, wherein:

FIG. 1 shows a cross-section of a mould in accordance with an embodiment of the disclosure including the cavity compartments of a cavity-defining structure that is placed inside the mould during moulding a foam article.

FIG. 2 shows a cross-section of a helmet in accordance with an embodiment of the disclosure including the shock-absorbing liner of a helmet comprising the cavity-defining structure.

FIG. 3 shows a cross-section of a portion of a helmet in accordance with an embodiment of the disclosure comprising the cavity-defining structure in the form of a covering layer.

FIG. 4 shows a cross-section of a portion of a helmet in accordance with an embodiment of the disclosure including a covering layer as the cavity-defining structure that also acts as the outer shell of the helmet.

FIG. 5 shows a cross-section of a helmet in accordance with an embodiment of the disclosure including a cavity-defining structure in the form of a layer covering the open cavities to create macro-cavities.

DESCRIPTION OF EMBODIMENTS

The detailed description set out below in connection with the included sketches, where like numerals reference like elements, is intended as a description of various embodiments of the claimed subject matter and is not intended to represent the only embodiments. Each embodiment described for this invention is given only as an example or illustration and should not be construed as precluding other embodiments. Any reference to a direction is specific only to the diagram, to further the clarity of the explanation, not to limit the actual use of the invention in that direction. The intention for the illustrated examples is not to be exhaustive or to limit the invention to the precise forms shown.

In the following section, specific details are explained to provide a thorough under-standing of exemplary embodiments of the present invention. It will be apparent to one familiar with the art that the embodiments shown may be realized without embodying every specific detail. The embodiments of the present invention may also employ any combination of features described below.

The following description provides several illustrations of a novel foam article that comprises a cavity-defining structure that is placed inside a mould when moulding a foam article using expanded polymer beads.

The presented disclosure is invented by studying and mimicking how structures are formed in nature. Mainly, it is inspired by the bone structure. A bone may look solid to the naked eye, yet it comprises micro-cavities and in addition to that, the bone can be hollowed to have macro-cavities. This allows the bone to have an optimum structure by harvesting the benefits of both micro and macro cavities. By imitating the bone structure, the present invention describes methods of moulding foam articles to enhance the foam article performance for a given application by creating and engineering larger cavities (macro-cavities) in the foam.

In the context of this invention, a macro-cavity is a cavity that can be seen by the naked eye.

Please note that the words cavity and porosity are used interchangeably in the present disclosure and assumed to have the same meaning.

As described further in this section, the cavity-defining structure allows having cavities and hollow spaces inside a foam article. The cavity-defining structure can be designed based on the application the foam is intended to be used for. The cavity-defining structure can reduce the amount of the expanded polymer beads used in a foam article, enhance its shock-absorbing ability, improve its durability, reinforce the foam structure, improve its thermal or acoustic insulation capability, and allow attachment of other means to the foam article.

Polymeric foams are used in a variety of applications such as shock absorption, heat insulation, sound insulation, comfort padding, floatation, and construction. The porosity in the foam helps with absorbing shocks, creating insulation, bringing comfort, reducing the weight of the object, floatation, and filling voids.

A calculated increase in the porosity of a foam article can significantly improve its performance for all the applications such as better impact mitigation, better insulation (both thermal and acoustic), better durability, and better floatation.

One of the common materials used for making floatation objects such as buoys is expanded polystyrene (EPS). The buoys usually are in very rough environments and receive impacts from vessels, waves, and shorelines. Using cavity-defining structure in the foam article used in marine application reduces the amount of polymer beads used in the foam article, increases its buoyancy, reinforces the structure of foam used in the floatation objects, improves the durability of the foam, and also the cavity-defining structure can provide attachment means for the foam article to securely connect that to other objects such as a boat, boat docking, or other parts of a vessel.

Conventional moulding of foams such as Expanded Polystyrene (EPS) and its bio-degradable version Expanded Polylactic Acid (EPA) is mainly dependent on the uniform micro-porosity that cured beads provide and the geometry of the foam article, and in most cases, no macro-porosity or macro-cavity is considered in the foam structure. Such designs of foams in the industry results in consuming more raw materials and manufacturing foams that are relatively heavy and their performance for a given application are not optimized. Although foams such as EPS and EPA are around 95% porous (volume ratio 20 air to 1 plastic), in almost all normal impact applications such as helmets and packaging, the foam does not compress 20 times of its original thickness. Having the foam compressed to two-thirds of its original thickness would be considered a good performance. A low compression of foam during impact results in transferring more of the shock to the object/person the foam was intended to protect. One of the reasons behind the low performance of foams is that the beads are placed tightly next to each other and there is no space for them to laterally expand when compressed vertically. Adding macro-porosity or macro-cavity to foams improves their compressibility and as a result, they can be lighter and yet perform better. Macro-cavities create air gaps that help the collapse of beads during impact and allow the foam to reduce the impact force considerably better. Macro-air-gaps also improve the insulation (both acoustic and thermal applications) and floatation. In addition, being able to control the porosity in a foam article allows designing the foam to the specifications which optimize its performance for a given application.

The present disclosure, in an aspect, introduces a novel foam article and a method of moulding that creates foam articles with a defined cavity which can reduce the weight, reinforce the structure of the foam article and it can increase its performance for a given application. In an embodiment, creating the macro cavity is achieved by placing a structure inside the mould prior to introducing the expanded polymer beads inside the mould. The macro-scale cavities are defined by the embedded cavity-defining structure in the mould and the structure creates cavities in the areas that are needed.

Conventional foam articles can include open-cavities. However, open cavities have limitations, and can only be used under certain conditions. For instance, for packaging using open cavities is quite common to reduce the foam used in the packaging. The concept is feasible as the foam is normally placed inside a box as the final packaging layer. Open cavities are not very practical if the open cavity will be exposed in the final product. In the present disclosure, the final foam has no open cavity or no explicit open cavities, and the cavities are mainly created inside the final foam article by using the cavity-defining structure. Such a concept, allows the foam to be used for a vast array of applications without the existing limitations.

In an embodiment, moulding with the expanded polymer beads and the cavity-defining structure is done in multiple moulding processes, such that a foam article with an open cavity is made with the expanded polymer beads in the first moulding process. Then, in the second moulding process, the foam article with the open-cavity is placed in a mould and is covered partially or entirely by the cavity-defining structure, and then the expanded polymer beads are introduced to the mould to create the intended cavity in the foam article. In this case, a layer covers the open cavity from the first step to define the closed cavity. The layer may be a thin film, membrane, sheet or mesh, and it can be conformable or rigid.

In an embodiment, moulding with the expanded polymer beads and the cavity-defining structure is done in multiple moulding processes, such that a foam article without an open cavity is made with the expanded polymer beads in the first moulding process. Then, in the second moulding process, the foam article without the open-cavity is placed in a mould and the cavity-defining structure in a form or shape of an object with an open-cavity is placed such that the object and the foam article made in the first moulding together create a closed cavity. Then, the expanded polymer beads are introduced to the mould to conform around the closed cavity. In this case, a rigid layer with an open cavity is placed in the mould in the second moulding process to define the closed cavity with the help of the first moulded foam article. The layer may be a thin sheet or mesh.

Moulded foam articles have a large variety of applications, and can be used in protective headgears, vehicle safety features and components, airplanes, boats, vessels, construction, thermal insulation, acoustic insulation, floatation devices, comfort paddings, and other applications. All conceivable applications of the foam articles can benefit from the addition of a cavity-defining structure and macro-cavities introduced in the present disclosure.

In recent years, using foams such as EPS foams in construction has significantly increased. EPS foam is used for insulating buildings (both thermal and acoustic) and filling voids when constructing bridges, roads, or buildings. By using the cavity-defining structure in the foam article, it is possible to reduce the amount of foam used in construction by 15% to 30%. At the same time, the foam will have superior properties in terms of strength, and insulation. It is known that creating enclosed cavities can improve thermal resistance. Polymer beads used in EPS foams are already filled with microcavities and are around 95% void and only 5% plastic. Such characteristic has made EPS lightweight, great insulant, and great shock absorber. The cavity-defining structure offers macro-cavities in addition to the existing microcavity in the foam. These two types of cavities (i.e. macro and micro) are complementary and enhance the performance of the foam for a given application.

The following detailed description comprises sketches, where similar numerals reference similar elements, is intended as a description of various embodiments of the claimed subject matter and is not intended to represent the only embodiments. Each embodiment defined for this invention is given only as an example or illustration, and should not be construed as precluding other embodiments. Any reference to a direction is specific only to the diagram, to further the clarity of the description, not to limit the actual application of the invention to that direction. The purpose of the illustrated examples is not to be exhaustive or to limit the invention to the precise forms shown.

In the following section, specific details are explained to provide an in-depth understanding of the exemplary embodiments of the present invention. It will be apparent to one familiar with the art that the embodiments shown may be realized without embodying every specific detail. The embodiments of the present invention may also employ any combination of features described below.

The following description provides several illustrations of the cavity-defining structure for foam articles by means of placing the cavity-defining structures in the mould and the methods for making the foam article have a defined macro cavity.

The present disclosure defines a novel foam structure with a macro-cavity and ways for moulding foam articles comprising macro-cavity, which allows the foam to perform better than foam articles that only comprise micro-cavities. In this regard, the cavity-defining structure allows the foam article to have both micro-cavities and macro-cavities, which results in better overall performance such as lower weight, better strength, better shock-absorption, better durability, and better insulation. Such characteristics are desirable in many applications of foam articles.

Moulding foam articles with macro-cavities results in consuming less raw material which makes the foam more cost-effective. The macro-cavities are preferably greater than 0.3 cm$^3$ in volume each, more preferably greater than 3 cm$^3$ depending on the application.

In one embodiment, a defined-cavity in macro-scale is created by placing a cavity-defining structure in a mould prior to filling the mould with foam ingredients such as expanded polymer beads or other foam ingredients in fluid or solid forms and a combination thereof.

In one embodiment, the cavity-defining structure in the mould generates one or more of: a cavity, hole, channel, vein, or any other hollow spaces in the foam article, as well as attachment means for the foam article.

In one embodiment, the cavity-defining structure creates open or closed cavities.

In one embodiment, the moulding includes multiple moulding phases, using the same or different moulding tools.

In one embodiment, the cavity-defining structure is made of one or more hollow compartments that are attached by means of solid or hollow connectors, and the connectors attach the hollow compartments to each other.

In one embodiment, the cavity-defining structure includes a grid-like structure of hollow compartments and hollow or solid connectors or layers. At certain locations, the cavity-defining structure can comprise attachment means that are used for attaching the foam article to other foam articles or objects. One example of the embodiment is when a grid-like structure is embedded in the foam as a cavity-defining structure in a way that part of the structure is protruded from the outer surface of the foam article. The protruded part of the cavity-defining structure can comprise an attachment means to securely attach the foam article to another foam article or other objects by using mechanical attachment means such as screws, locking mechanisms, pins, rivets, nails, straps, buckles, or cords. The applications of such foam articles can be in the installation of the insulation panels, shock-absorbing parts for vehicles, shock-absorbing parts of head and body protective equipment (e.g. foldable helmet), floatation parts, or any other conceivable applications for the foam with such features.

In one embodiment, the hollow space inside the foam article is created by the cavity-defining structure to enhance the foam in terms of weight, strength, shock absorption, thermal insulation, acoustic insulation, floatation, and a combination thereof.

In one embodiment, the foam article comprises macro-cavities and micro-cavities. Most foams such as EPS and EPA are made of expanded polymer beads which in turn are made from resins that are expanded for more than 20 times their original volume. Such expansion dramatically reduces the foam density and increases its porosity at a micro-level, and as a result, the foam article can mostly absorb impact energy through the deformation or collapse of the foam article. However, foams to better collapse require space to collapse in one direction and expand a bit in another direction. Therefore, adding macro-cavity by means of a cavity-defining structure helps the foam article have a much better performance. In impact, the bottom-out phenomenon happens when a foam is not able to compress any further during impact. Consequently, the protected object by the foam experiences a high amount of impact or acceleration, and this results in damage or injury. This is a serious issue in helmet design and helmets that bottom out during standard impact tests may not pass the standard certification. By introducing macro-cavities inside the shock-absorbing liner of a helmet, it is possible to improve helmet shock absorption and reduce the chance of bottoming out for a given impact speed. The cavity-defining structure can enhance foam impact absorption along with lowering its weight and improving foam durability.

In one embodiment, the cavity-defining structure reduces the average density of the foam article.

The cavity-defining structure allows the designers and engineers to choose where more porosity or cavity in a foam article is required and design the foam article accordingly. The foam applications in safety, sensitive equipment and transportation can particularly benefit from using the cavity-defining structure in moulding foam articles. Such applications can be imagined for helmets, and other body protective equipment, vehicle protective parts (e.g. car bumper), vehicle comforting parts, aeroplane parts, vessels, flying objects, or any other applications of a foam article.

In one embodiment, the cavity-defining structure comprises one or more hollow compartments that are attached or detached from each other. This feature allows parts that need a macro-cavity to be equipped with the exact amount of cavity they require for a given application.

In one embodiment, the hollow compartments of the cavity-defining structure inside the mould are pressurized positively or negatively (compared to the atmospheric pressure) during the moulding process.

In one embodiment, the cavity-defining structure is placed in the mould during moulding such that the cavity-defining structure does not allow the part of the foam article formed on one side of the cavity-defining structure to bond to the foam article formed on the other side of the cavity-defining structure. In the next step, the mould is opened and the cavity-defining structure is removed and the two parts of the foam article are attached to each other by mechanical or chemical attachment means and a combination thereof. One way to bond the two parts is to close the mould after removing the cavity-defining structure and introduce heat, steam, and pressure to bond the two parts of the foam article together.

In one embodiment based on the previous embodiment, the cavity-defining structure is an inflatable structure comprising non-stick materials such as silicon rubber or coating which allows the cavity-defining structure to be easily detached and removed from the parts of the foam article after moulding.

In one embodiment as described in the last two embodiments, the foam article is made of more than two parts.

In one embodiment as described in the last three embodiments, the cavity-defining structure is made of more than one part.

In one embodiment, the positive pressure does not allow the cavity-defining structure or parts of it to collapse due to the heat, steam and pressure applied in moulding when expanded polymer beads are introduced to the mould.

In one embodiment, the hollow compartments of the cavity-defining structure in the mould are pressurized after completion of the moulding process. This embodiment allows using expandable air-bladders to be used in conjunction with a foam article.

In an embodiment, the hollow compartments of the cavity-defining structure are sealed or contained before or after the moulding process.

In an embodiment, the hollow compartments of the cavity-defining structure are not sealed and contained before or after the moulding process.

In one embodiment, the hollow compartments of the cavity-defining structure are open-ended.

In an embodiment, more than one moulding process is needed to create the cavity in the final foam article. In the first moulding, a foam article is moulded to have the desired open cavities. In the next moulding process, the created foam with the open cavities in the first moulding is placed in the second mould. Then, the open cavities are covered partially or entirely by a cavity-defining structure in the form of a covering layer. Then the second moulding takes place. The cavity-defining structure does not allow the polymer beads to enter the open cavities formed in the first moulding. The method creates the intended cavities for the final foam article.

In one embodiment, the method described above can be used multiple times to create multiple layers of cavities.

In one embodiment, the cavity-defining structure is a layer made of conformable and flexible materials.

In one embodiment, the cavity-defining structure is a layer made of rigid materials.

In one embodiment, the cavity-defining structure is a layer that features spaced holes.

In one embodiment, the cavity-defining structure is a layer that features spaced holes such that the size or diameter of the holes in the layer is equal to or smaller than the average size or diameter of the introduced polymer beads in the mould. Such an arrangement does not allow the polymer beads to enter the created cavity space of the foam article through the holes. Examples of such materials for the layer are mesh-fabric, mesh-plastic, and wire-mesh. Using a layer with spaced holes reduces the weight of the layer and improves the bonding between the polymer beads placed at the two opposite sides of the layer of the cavity-defining structure without allowing the polymer beads to enter the cavities.

In one embodiment, the layer with spaced holes used as the cavity-defining structure for a helmet covers the air vents of the helmet and acts as a safety screen or mesh for the vents similar to a bug screen.

In one embodiment, the open-cavities created in the first moulding are covered by a cavity-defining structure in the form of a layer of material that is already conformed to a form suitable for covering the open cavities in the second moulding. Such layers can be made by methods such as vacuum-forming of plastic sheets or other materials.

In one embodiment, the foam article moulded with open cavities is covered by a cavity-defining structure in the form of a covering layer without introducing more polymer beads on the top of the cavity-defining structure.

In an embodiment based on the previous embodiment, the cavity-defining structure is attached to the moulded foam article by mechanical or chemical attachment means such as insert, adhesive, heat and pressure, thermal bonding, co-moulding, in-moulding, hook-and-loop attachment, rivet, screw, sewing, strap, pin, holes, and a combination thereof. One application is to mould the shock-absorbing liner of a helmet with open-cavities on the outward surface of the helmet (facing away from the head), and then cover the open-cavities created on the moulded shock-absorbing liner (foam article) using an outer shell for the helmet by adhesive or co-moulding. The created cavities on the shock-absorbing liner enhance the helmet's linear and rotational performance and reduce the weight of the helmet.

In one embodiment, the cavities created by the cavity-defining structure are used to place sensors, wire, battery, electronics, light, or any other conceivable equipment for a helmet.

In one embodiment, the cavities are used to place other types of shock-absorber such as a thin-walled structure, truss, auxetic structure, lattice or other shock-absorbing structures under or in the cavity-defining structure.

In one embodiment, the method described above can be used for parts of vehicle (such as a bumper), vehicle body, planes, vessels or any other conceivable applications.

In an embodiment, the cavities are created in the foam article by creating two foam articles with open cavities by two moulds and joining them to become one article with internal cavities.

In one embodiment, the cavity-defining structure is made in the second moulding process by placing one or more plastic sheets securely on the open cavities created in the first moulded foam article. Then, the expanded polymer beads are introduced into the mould to create the final foam article with the intended cavities.

In one embodiment, the cavity-defining structure is a layer previously conformed to the shape needed to cover the open cavities of the first foam article.

In one embodiment, accessories such as an insert or anchor for attaching parts such as chinstrap, adjustment means, or other features for a helmet are attached to the cavity-defining structure.

In an embodiment, prior to the second moulding, shock-absorbing materials, structures, or equipment such as gas-filled containers or bladders are placed in or attached to the created cavity by the cavity-defining structure.

In an embodiment, prior to the second moulding, shock-absorbing materials, structures, or equipment such as gas-filled containers are placed in or attached to the cavity-defining structure.

In an embodiment, accessories such as sensors, electronics, wires, battery, positioning device, speedometer, camera, reflectors, light, cord, chain, or other conceivable accessories are placed in or attached to the cavity or over the cavity-defining structure of the foam article.

In one embodiment, the cavity-defining structure and its extension comprise plastic, organic polymers, synthetic polymers, ceramic, metal, polycarbonate plastic, Acrylonitrile Butadiene Styrene (ABS) plastic, rubber, fabric, fibre, Kevlar (for military use or other applications because it does not tear), Teflon, silicone rubber, organic materials, synthetic materials, or a combination thereof. The cavity-defining structure can be coated with adhesive, paint or non-stick materials depending on the application of the moulded foam article.

In one embodiment, the cavity-defining structure remains inside the moulded foam article after completion of the moulding process. In the embodiment, the structure reinforces the foam article to enhance its strength, durability and/or shock-absorbing capability.

In one embodiment, the cavity-defining structure is removed after or before the final foam article is made.

In one embodiment, the cavity-defining structure comprises an insert, connecting hole, pin basket, or anchor in the foam article to attach other means to the foam.

In one embodiment, a protective headgear such as a helmet made of foam article is equipped with a cavity-defining structure to enhance its performance and durability.

In one embodiment, a helmet made of foam is equipped with the cavity-defining structure wherein the cavity-defining structure reinforces the foam structure to be more shock-absorbing and durable.

In an embodiment, in addition to creating cavities in the shock-absorbing liner of the helmet, the cavity-defining structure provides attachment means for attaching parts such as fitting liner, chinstrap and adjustment means to the helmet, or accessories such as a sensor, electronics, wire, battery, positioning device, speedometer, camera, reflectors, cord, chain, light, or other conceivable helmet accessories to the helmet. In the same way, the cavity-defining structure can provide anchoring or attachment means for other applications in acoustic insulation, heat insulation, construction, protective parts in vehicles, flying objects, vessels, and floating equipment.

In an embodiment, the cavity created by the cavity-defining structure is used for placing or attaching any conceivable accessories for a given application.

In one embodiment, the cavity-defining structure inside the foam article is removable and is removed after moulding the foam article is complete. The embodiment can include a flexible cavity-defining structure that is pressurized during the moulding process, and after moulding is done, by reducing the pressure, the deflected cavity-defining structure can be removed from an opening in the foam article. In one embodiment, the structure comprises silicone rubber or coated with non-stick materials such as Teflon to easily remove the cavity-defining structure from the foam article after the moulding process. In one embodiment, the flexible cavity-defining structure also comprises detached or attached extension parts to hold the flexible structure in place during the moulding process. In one embodiment, the detached extension parts of the cavity-defining structure remain in the moulded foam article.

In one embodiment, the cavity-defining structure consists of one or more solid or flexible parts that are removed after moulding. After removing the cavity-defining structure, the parts of the foam article can be permanently or temporarily attached to each other to create the final foam article. In one embodiment, the cavity-defining structure used for moulding can be replaced by another cavity-defining structure to provide other benefits such as reinforcing the structure or providing an accessory for a given application.

In one embodiment, the cavity-defining structure allows creating a foldable or retractable object made of a foam article.

In an embodiment, a foldable helmet is made by using a cavity-defining structure. The helmet can be made from multiple parts that are attached to each other by the attachment means provided or facilitated by the cavity-defining structure. Such attachment means includes but is not limited to any mechanical attachments such as buckles, straps, chains, rivets, hook-and-loop attachments, locking mechanism, and a combination thereof.

In one embodiment, the cavity-defining structure reinforces the structure of the foam article. Foams can be fragile, and brittle, and they can break easily into pieces. The cavity-defining structure acts similarly to a reinforcing bar in concrete and strengthens the structure of the foam article.

In one embodiment, the cavity-defining structure includes perforation, holes, or openings in certain locations which can allow the structure to better anchor to the foam article and reinforce the foam article and can better secure the cavity-defining structure inside the foam article.

In one embodiment, the cavity-defining structure is pressurized during the moulding process and the perforations, holes, or openings in the structure create more cavities in the foam at the locations of the perforations, holes, or opening by means of the positive pressure of the discharging gas such as air or steam that is discharging at the openings where the gas meets with the polymer beads. The method allows creating additional cavities without increasing the size of the cavity-defining structure. Furthermore, the embodiment reduces the weight of the manufactured foam article by generating more cavities in the foam while using a structure with the same weight or lighter. The size of the additional cavities depends on the pressure of the gas in the cavity-defining structure. Using high pressure increases the size of the additional cavities in the foam article on the outward surface of the cavity-defining structure.

In one embodiment, the cavity-defining structure has extended parts to keep the structure fixed inside the mould and avoid moving or dislocating during the moulding process. The extended part of the cavity-defining structure can be solid or hollow pieces, and it can be attached or detached from the rest of the cavity-defining structure. In one embodiment, the extension of the cavity-defining structure can avoid certain parts of the foam article to bond at certain areas of the foam article to other parts of the foam article, and therefore, it facilitates the removing process of the cavity-defining structure after moulding and create the final foam article by attaching the parts of the foam articles without the cavity-defining structure.

In one embodiment, the extended parts of the cavity-defining structure reach the interior or exterior surface of the mould. The extended parts keep the cavity-defining structure in place during moulding and prevent dislocation of the structure during the moulding process.

In one embodiment, the hollow space in the cavity-defining structure or created by the cavity-defining structure is used for placing or attaching sensors, batteries, positioning devices, speedometer, camera, light, electronic parts, cord, strap, chain, wirings, inserts, connecting pieces of foam articles or any other accessories that are required by the application of the foam article. One example of using the cavity-defining structure is in the shock-absorbing liner of a helmet. It is possible to place sensors, lights, electronics, batteries, wires, cameras in the hollow space of the cavity-defining structure or hollow space created in the foam by the structure, or attach pieces of the helmet together, or attach parts of the accessories of the helmet.

In one embodiment, the cavity-defining structure is partly embedded in the foam and partly outside the foam. The part of the structure that is placed outside the foam article can be used for installing and securing the foam article, attaching multiple foam pieces together, or attaching accessories to the foam. One example of the application is in construction and insulation that allows the foam article panels to be attached together or to the building structure to cover a large surface area such as a ceiling, or a wall. In one embodiment, a portion of the cavity-defining structure is embedded in the foam and a portion of it is on the outer surface of the foam article, wherein the cavity-defining structure is partly embedded in the foam article and partly is placed outside of the foam article to attach other means to the foam article based on the application the foam article is used for. In an embodiment, the part of the cavity-defining structure that is outside of the foam has an impact absorbing characteristic.

In one embodiment, the part of the cavity-defining structure that is inside or outside the foam structure has a shock-absorbing capability. An example of it is when the outside or inside part of the cavity-defining structure is made of a thin-walled structure, truss, auxetic structure, lattice or other shock-absorbing structures to create a multiple-stage shock-absorbing design.

In one embodiment, a thin-walled structure, truss, auxetic structure, lattice or other shock-absorbing structures are placed in the hollow space (volume) created by the cavity-defining structure to create a multiple-stage shock-absorbing design.

In one embodiment, the cavity-defining structure comprises hollow compartments that are connected to one another.

In one embodiment, the cavity-defining structure comprises one or more hollow compartments that are detached from one another.

In one embodiment, the hollow compartment of the cavity-defining structure is contained or sealed before or after the moulding process.

In one embodiment, the hollow compartments are created by a combination of a cavity-defining structure and introducing a high expansion material or agent in the mould along with the polymer beads. Such material can create cavities larger than the micro-cavities in the beads depending on the size of the introduced high expansion material.

In an embodiment, the high expansion material is in the form of solid particles of carbon dioxide (dry ice) or nitrogen or other materials or elements with a high expansion ratio between its solid-form/liquid-form and its gas-form. The high-expansion material acts similar to a cavity-defining structure by expanding or sublimating due to the heat in the moulding process and creates cavities in the foam article.

In one embodiment, the high expansion material or element is used in moulding a foam creates the cavity-defining without introducing any additional cavity-defining structure.

In one embodiment, the hollow compartment of the cavity-defining structure is open-ended and not contained or sealed.

In an embodiment, the cavity-defining structure is used for making any type of compressible foam article.

In one embodiment, the cavity-defining structure is used in the shock-absorbing liner of a helmet to reduce the linear and rotational acceleration of the head during impact.

In one embodiment, the cavity-defining structure can be partially exposed outside the final foam article to have a particular application such as attaching parts or protecting the foam in certain areas. One application is to design the cavity-defining structure for helmets such that the cavity-defining structure at certain areas inside the helmet where the helmet contacts the head is exposed on the helmet inwardly surface to be used for placing and attaching the fitting liner of the helmet. Such an arrangement can enhance helmet performance and extend the durability of the attachment means of the fitting liner or other attached accessories In any of the previous embodiments, the foam article equipped with the cavity-defining structure is used for making protective equipment, packaging, thermal insulation, acoustic insulation, floatation, space-filler, comfort-padding, construction, transportation equipment, vehicle, vessel, flying vehicle, or flying object.

Turning to [FIG. 1], a cross-section of the mould 17 is shown that the cavity-defining structure 19 is placed inside the mould 17 prior to moulding foam article 18 inside the mould 17. In some applications to secure the location of the cavity-defining structure 19 inside the mould 17, and avoid dislocating the cavity-defining structure 19 during the moulding process, the cavity-defining structure 19 can include an extension or any holding means. The hollow extension 31, or solid extension 32 can be used depending on the application of the foam article 18. The extensions 31, and 32 can also reinforce the foam article 18. In one embodiment, the mould 17 can include one or more openings 34 to allow pressurizing the cavity-defining structure during the moulding process.

In one embodiment, the mould 17 can be made of multiple pieces and the cavity-defining structure 19 can include the extension 35 that is exposed to the outside of the mould 17 from the opening in the mould. The end of extension 35 can be equipped with mechanical inserts such as hooks and buckles or other means to attach the foam article to other foam articles or other objects. The embodiment can be beneficial for installing articles with minimum or no need for additional means to keep the foam articles in place for an application. Such an embodiment can be used for installing foam articles such as panels for insulation, impact protection (such as a foldable helmet), comfort-padding, floatation, construction or other applications that can benefit from such an arrangement.

In one embodiment, the cavity-defining structure 19 is joined by one or more enclosed cavity-defining structures 30 that are pressurized positively or negatively or at atmospheric pressure and are connected by attachment 29 to the cavity-defining structure 19.

In one embodiment, the cavity-defining structure 19 includes the opening 24 at one or more locations in the cavity-defining structures 19. The cavity-defining structure 19 can be pressurized positively or negatively from the opening 34 during the moulding process. If the cavity-defining structure 19 is positively pressurized by a gas such as air or steam, the pressure in the cavity-defining structure 19 allows more cavities to be formed at the openings 24 in the foam article 18. This allows increasing the volume of the cavity in the foam article 18 without increasing the size of the cavity-defining structure 19. If the cavity-defining structure 19 is negatively pressurized, the foam 18 can partially or entirely enter the cavity-defining structure 19, which can strengthen the foam article 18 and firmly hold and anchor the cavity-defining structure 19 inside the foam article 18.

The mould can include vents for steaming or exiting the air inside the mould that are not shown in [FIG. 1] or other figures for keeping the drawing uncluttered with the prior-art information.

In an embodiment, the foam article 18 equipped with the cavity-defining structure 19 is used for floatation. In such an embodiment, the cavity-defining structure 19 is placed inside the mould 17, prior to introducing expanded polymer beads to create the foam article 18. The created foam article 18 can have better floatation, better strength, better durability, and also have built-in attachment means at extension 35. In an embodiment, the extension 35 can be used to attach the foam article to other foam articles, vessel, boat docking, shoreline on any other conceivable marine applications for the foam article 18. Once, the moulding is completed, the opening 34 can be closed or plugged.

Turning to [FIG. 2], a cross-section of the helmet 14 worn on the head 13 is illustrated that includes the outer shell 10, and shock-absorbing liner 11. In one embodiment the shock-absorbing liner 11 is equipped with the cavity-defining structure 12 at one or more locations to enhance the helmet performance by reducing the linear and rotational acceleration of the head 13. In one embodiment, the cavity-defining structure 12 includes the solid extension 38 and/or hollow extension 39 at one or more locations to securely place the cavity-defining structure 12 inside the mould during the moulding process.

In one embodiment, extension 37 helps separate the shock-absorbing liner 11 to multiple pieces to remove the cavity-defining structure 12 after moulding. The pieces of the shock-absorbing 11 (not shown in [FIG. 2]) then will be attached together using any mechanical or chemical attachment means such as pressure, heat, in-moulding, co-moulding, adhesive, buckles, and a combination thereof.

In one embodiment, extension 37 is not included in the foam article to allow the pieces of the shock-absorbing 11 (not shown in [FIG. 2]) to bond to each other.

In one embodiment, the cavity-defining structure 12 comprises opening 15 to allow pressurizing the cavity-defining structure during the moulding process.

In one embodiment, the cavity-defining structure 12 reaches the inner surface 40 of the helmet 14 at one or more locations 41.

In one embodiment, the cavity-defining structure 12 includes the solid extensions 37, 38 and/or hollow extension 39 at one or more locations to enhance the structure of the helmet 14.

In one embodiment, the cavity-defining structure 12 includes other attaching means conventionally used in foam moulding to keep the cavity-defining structure 12 in place during moulding.

In one embodiment, one or more of the extensions 37, 38 and 39 reach the outer surface of the shock-absorbing liner such as the inner surface 40 or the outer shell 10 of the helmet 14 and comprise attachment means at the end part of the extensions 37, 38 and 39 that attach to other parts of the helmet such as an inner shell, or comfort padding in a helmet.

In one embodiment, the extensions 37, 38 and 39 can have a shock-absorbing ability.

In one embodiment, extensions 37, 38 and 39 reach the outwardly or inwardly surface of the helmet 14.

In an embodiment, the extensions 37, 38, or 39 can cover an area of the inner surface 40 and provide a surface for placing and/or attaching the fitting liner (not shown in [FIG. 2]) or other parts such as the adjustment system, and the chin strap of the helmet.

In one embodiment, the cavity-defining structure 12 or its extensions 37, 38, or 39 are used to attach the fitting liner (not shown in [FIG. 2]) to the helmet 14. For instance, the cavity-defining structure 12 at locations similar to location 41 or the extensions 37, 38, or 39 can facilitate attaching the fitting liner by providing attachment means such as inserts, rivets, pins, hook-and-loop attachments, snap pin baskets or holes to attach the fitting liner to the helmet 14.

In one embodiment, helmet parts such as fitting liner, chinstrap, adjustment systems, sensors, camera, adjustment mechanism, cord, chain, or other conceivable accessories (not shown in [FIG. 2]) are attached to the cavity-defining structure 12 or its extensions 37, 38 and 39.

During the process of moulding foams, for some foams such as EPS, steam is used through special vents to enter or exit the foam article during the moulding process. To keep the drawings simple and understandable, those details that are previously understood by the prior-arts in this field are not shown or explained.

In one embodiment, the cavity-defining structure 12 includes openings or holes 42 to increase or decrease the cavities in the foam of shock-absorbing liner 11 by pressurizing positively or negatively from the opening 15 of the cavity-defining structure 12 during the moulding process.

In one embodiment, the cavity-defining structure 12 can be in any of the forms and shapes described in the previous embodiments and used for helmets, or other applications.

Turning to [FIG. 3], a cross-section 50 of a portion of a helmet (coronal/frontal view) is shown that comprises outer shell 51, part one shock-absorbing liner 52 that comprises cavity 53 that is made in the first moulding process. The cavity-defining structure 54 is a layer of covering that covers the cavity 53 during the second moulding process to avoid polymer beads entering the cavity 53 during moulding. Part two shock-absorbing liner 56 is created in the second moulding process on the top of the cavity-defining structure 54. A design with a cross-section similar to cross-section 50 is similar to the structure of the bone and it can enhance the performance of the helmet by reducing the linear and rotational acceleration of the head during impact. It also reduces the amount of polymer beads used in the helmet which reduced the weight of the helmet. Using the cavity-defining structure 54 in the design reinforces the structure shown in the cross-section 50.

In one embodiment, the cavity-defining structure 54 can be flat, freeform, or curved towards the cavity 53 or away from the cavity 53, and a combination thereof.

In one embodiment, the cavity-defining structure 54 includes one or more holes 55 to allow the part one shock-absorbing liner 52 to bond to the part two shock absorbing liner 56 in the second moulding process.

In one embodiment, the holes 55 are placed in a portion or entire surface of the cavity-defining structure 54.

In one embodiment, the holes 55 create a mesh surface with spaced holes for the cavity-defining structure 54.

In one embodiment, the average diameter of holes 55 is equal to or smaller than the average diameter of the polymer beads that are introduced to the mould.

In one embodiment, one or more of the holes 55 are placed on matching raised studs (not shown in [FIG. 3]) that were already created in part one shock-absorbing liner 52 to securely hold the cavity-defining structure 54 in place during the second moulding process.

In one embodiment, the cavity-defining structure 54 is a flexible or conformable material.

In one embodiment, the cavity-defining structure 54 is a flexible mesh layer comprising spaced holes.

In one embodiment, the width of part one shock-absorbing liner 52 and part two shock-absorbing liner 56 at a location where they meet the cavity-defining structure 54, is wider than the width of the cavity-defining structure 54. This feature allows part one shock-absorbing liner 52 and part two shock-absorbing liner 56 to bond directly with each other at some locations and also the cavity-defining structure 54 to be hidden in the final foam article.

In one embodiment, the cavity-defining structure 54 is coated with an adhesive or a paint to better bond to part one shock-absorbing liner 52 and/or part two shock-absorbing liner 56.

In one embodiment, the helmet or any other objects that benefit from such an arrangement uses as many as needed the same design shown in the cross-section 50 in a row or sandwich on the top of each other with or without the outer shell 51.

In an embodiment, the cross-section 50 belongs to a foam article used for applications such as insulation, floatation, construction, packaging, or any other conceivable application for foam article equipped with cavity-defining structure 54 with or without having the outer shell 51.

In an embodiment, cross-section 50 belongs to a foam article used for construction with or without having the outer shell 51 such that a large number of cavity 53 are placed next to each other with a wall of foam similar to shock-absorbing line 52 in between similar to an array of cavities (grid-like). Such cavities (i.e., cavity 53) can have connected volume or be self-contained. In one embodiment, each cavity 53 in the array of the cavity 53 is self-contained. This allows the foam article to be suitable for applications such as construction that customization and cutting foam are normally needed when blocks or panels are used to fill a space with fixed dimensions.

Turning to [FIG. 4], a cross-section 46 of a portion of a helmet (coronal/frontal view) is shown that comprises cavity-defining structure 44 which plays the role of an outer shell or inner shell, cavity 47, and the shock-absorbing liner (foam article) 45. In an embodiment, the shock-absorbing liner 45 is made to include cavity 47. In the next step, the outer shell 44 is attached to the shock-absorbing liner 45 using a mechanical or chemical attachment such as co-moulding, in-moulding, heat, pressure, adhesive, insert, pins, screws, strap, rivet, or a combination thereof.

In an embodiment, the cavity-defining structure 44 reinforces the foam article's structure. Without the cavity-defining structure 44, the shock-absorbing liner 45 will be fragile and vulnerable to damage. When the cavity-defining structure 44 is added to the foam structure, the foam article 46 with the correct size of the cavity 47 can absorb shocks the same or better than a similar foam structure without the cavity 47.

In one embodiment, the object shown in [FIG. 4] can be any protective equipment to protect the body or the head or used in a vehicle protective parts (e.g. car bumper), vehicle comforting parts, aeroplane parts, vessels, flying objects, or any other applications of a foam article.

In an embodiment, an array of foam articles 45 and cavities similar to the cavity 47 are placed next to each other to create the final shape of the foam article.

Turning to [FIG. 5], the cross-section 69 (sagittal view) of a helmet over the head 66 is shown that comprises an outer shell 60, part one shock-absorbing liner 61, part two shock-absorbing liner 64, one or more cavities 63, and the cavity-defining structure 62.

In one embodiment, part one shock-absorbing liner 61 along with the outer shell 60 is made such that to have cavity 63 in the shock-absorbing liner 61. Then, in the next moulding process, the cavity-defining structure 62 is added to cover the cavity 63 prior to introducing the polymer beads to the mould to create the part two shock-absorbing liner 64.

In one embodiment, cavities 63 are divided by including raised areas 67 in the part one shock-absorbing liner. The raised areas 67 can be in any shape and form and can get close or reach to the cavity-defining structure 62.

In one embodiment, the raised area 67 acts as a dividing wall between cavities 63 and provides a desired structure for the cavity with certain strength for a given application.

In one embodiment, the raised area 67 provides support for securely holding the cavity-defining structure in place.

In one embodiment, the cavity-defining structure 62 has holes 68 in it. The holes can be placed in any configuration or shape. Holes 68 can improve the bonding between part one shock-absorbing liner 61 and part two shock-absorbing liner 64. It can also reduce the weight of the cavity-defining structure 62. The size of holes 68 can be selected to be the same or smaller than the average size of the polymer beads introduced to the mould in the second moulding process.

In one embodiment, the cavity-defining structure 62 is a flexible or conformable layer.

In one embodiment, the cavity-defining structure 62 is a rigid layer.

In one embodiment, the cavity-defining structure 62 comprises fabric, plastic, metal, or fibre.

In one embodiment, the cavity-defining structure 62 is a mesh layer or screen layer with spaced holes or openings.

In one embodiment, the foam article made by using the cavity-defining structure is made of any type of foam made from pre-expanded beads or foams made from the foam ingredients in other forms or shapes.

While illustrative embodiments have been illustrated and described, it will be appreciated that various changes can be made therein without departing from the spirit and scope of the invention. Any described feature that is described in singular or plural form can be both in singular or plural form for a given application.

The invention claimed is:

1. A method of manufacturing a foam article, the method comprising: providing a cavity-defining structure into a mould; and performing a moulding process by introducing expanded polymer beads into the mould to create a cavity in the foam article, wherein the cavity-defining structure comprises at least one of: objects with open cavities, objects with closed cavities, sheets, covering layers, meshed layers, objects with perforations, hollow bodies, or solid bodies.

2. The method of claim 1, wherein the moulding process is done in two or more phases using covering layers as the cavity-defining structure in the foam article.

3. The method of claim 1, wherein the moulding process is done in one phase using objects with open cavities, objects with closed cavities, or hollow bodies as the cavity-defining structure in the foam article.

4. The method of claim 2, wherein moulding with the expanded polymer beads and the cavity-defining structure is done in plural moulding processes, wherein the foam article with an open-cavity is made in a first moulding process, and in a second moulding process, the open cavity is covered partially or entirely by the cavity-defining structure, and then the expanded polymer beads are introduced to the mould to enclose the cavity-defining structure.

5. The method of claim 2, wherein moulding with the expanded polymer beads and the cavity-defining structure is done in a single moulding process, wherein the cavity-defining structure is placed inside the mould prior to introducing the expanded polymer beads into the mould to create the cavity in the foam article conforming to the cavity-defining structure.

6. The method of claim 1, wherein the cavity-defining structure comprises holes or openings.

7. The method of claim 1, wherein the cavity-defining structure or the cavity created by the cavity-defining structure in the foam article is positively or negatively pressurized during the moulding process.

8. The method of claim 5, wherein the cavity-defining structure is pressurized during the moulding process to create additional cavities in the foam article by discharging gas or steam into the polymer beads at locations corresponding to the holes and openings in the cavity-defining structure.

9. The method of claim 1, further comprising placing sensors, cameras, lights, batteries, electronics, wirings, inserts, cords, chains, attachment means or any other accessories into the cavities created by the cavity-defining structure in the foam article.

10. The method of claim 1, further comprising covering the foam article with a resilient outer shell for use in a helmet.

11. A foam article comprising expanded polymer heads and a cavity defined by a cavity-defining structure within the expanded polymer beads, wherein the cavity-defining structure comprises objects with one of: open-cavities, objects with closed cavities, sheets, covering layers, meshed layers, objects with perforations, hollow bodies, solid bodies, or a combination thereof.

12. The foam article of claim 10, wherein the expanded polymer beads conforms to a shape of the cavity-defining structure to create the cavities.

13. The foam article of claim 10, wherein the foam article with the open-cavity is covered partially or entirely by the cavity-defining structure.

14. The foam article of claim 12, wherein the expanded polymer beads are divided into a first and second portions by the cavity-defining structure, which structure comprises a sheet covering the cavity formed in the first portion.

15. The foam article of claim 10, wherein the cavity-defining structure comprises holes or openings.

16. The foam article of claim 14, wherein a size of the holes and openings in the cavity-defining structure is equal to or smaller than an average size of the polymer beads.

17. The foam article of claim 10, wherein the cavity-defining structure is made of a material selected from a group consisting of: plastic, organic polymers, synthetic polymers, ceramic, metal, rubber, fabric, textile, fibre, Kevlar, Teflon, silicone rubber, organic materials, adhesive, paint, synthetic materials, or a combination thereof.

18. The foam article of claim 14, wherein the cavity-defining structure has openings and additional cavities are formed into the polymer beads on an outward surface of the cavity-defining structure.

19. The foam article of claim 10, wherein the foam article is used in anyone of: protective equipment, packaging, thermal insulation, acoustic insulation, floatation devices, filling space, construction, comforting equipment parts, vehicle parts, vessel parts, flying-vehicle parts, aeroplane parts, and flying object parts.

* * * * *